INVENTOR.
WILLIAM B. SCHLUETER

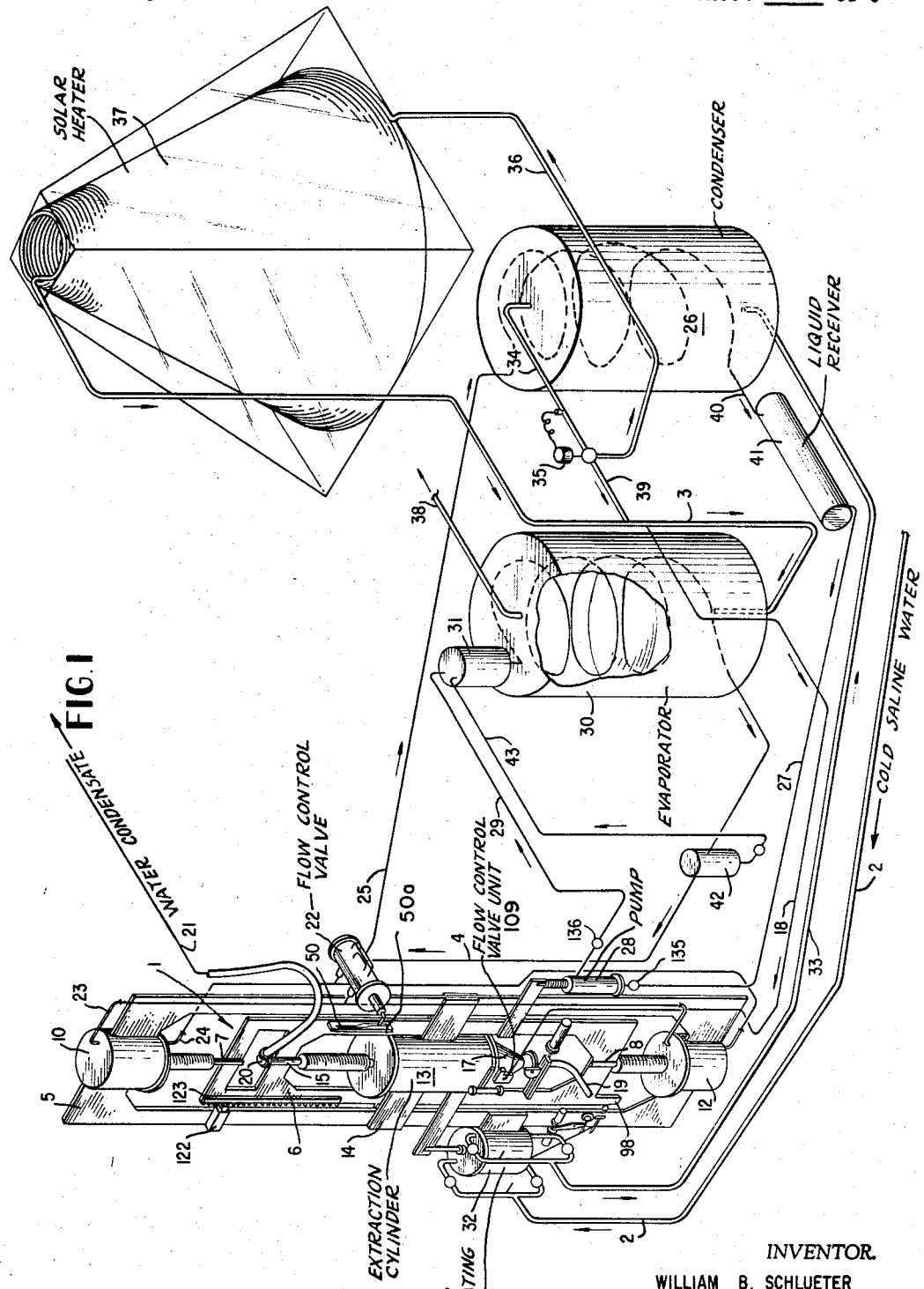

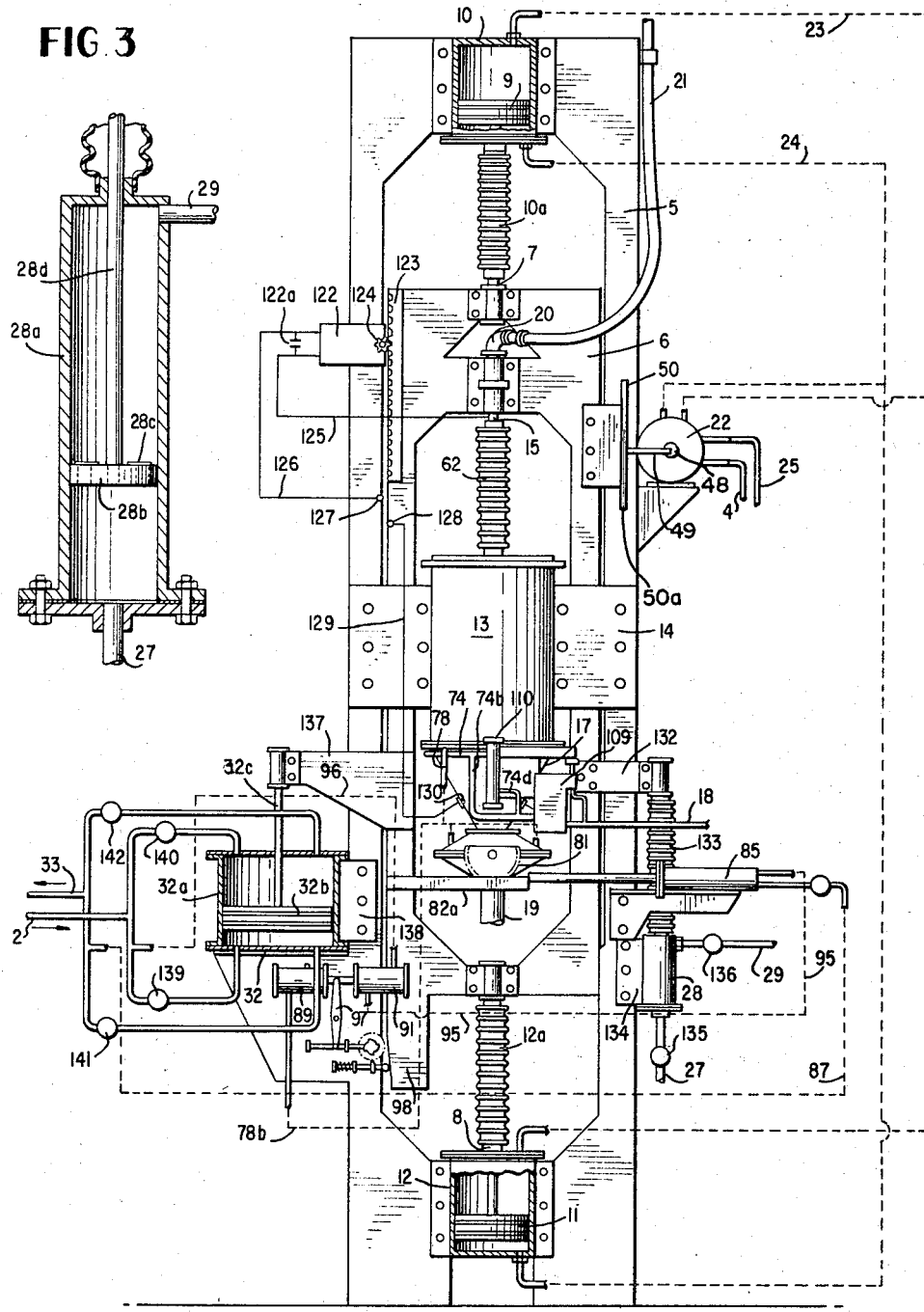

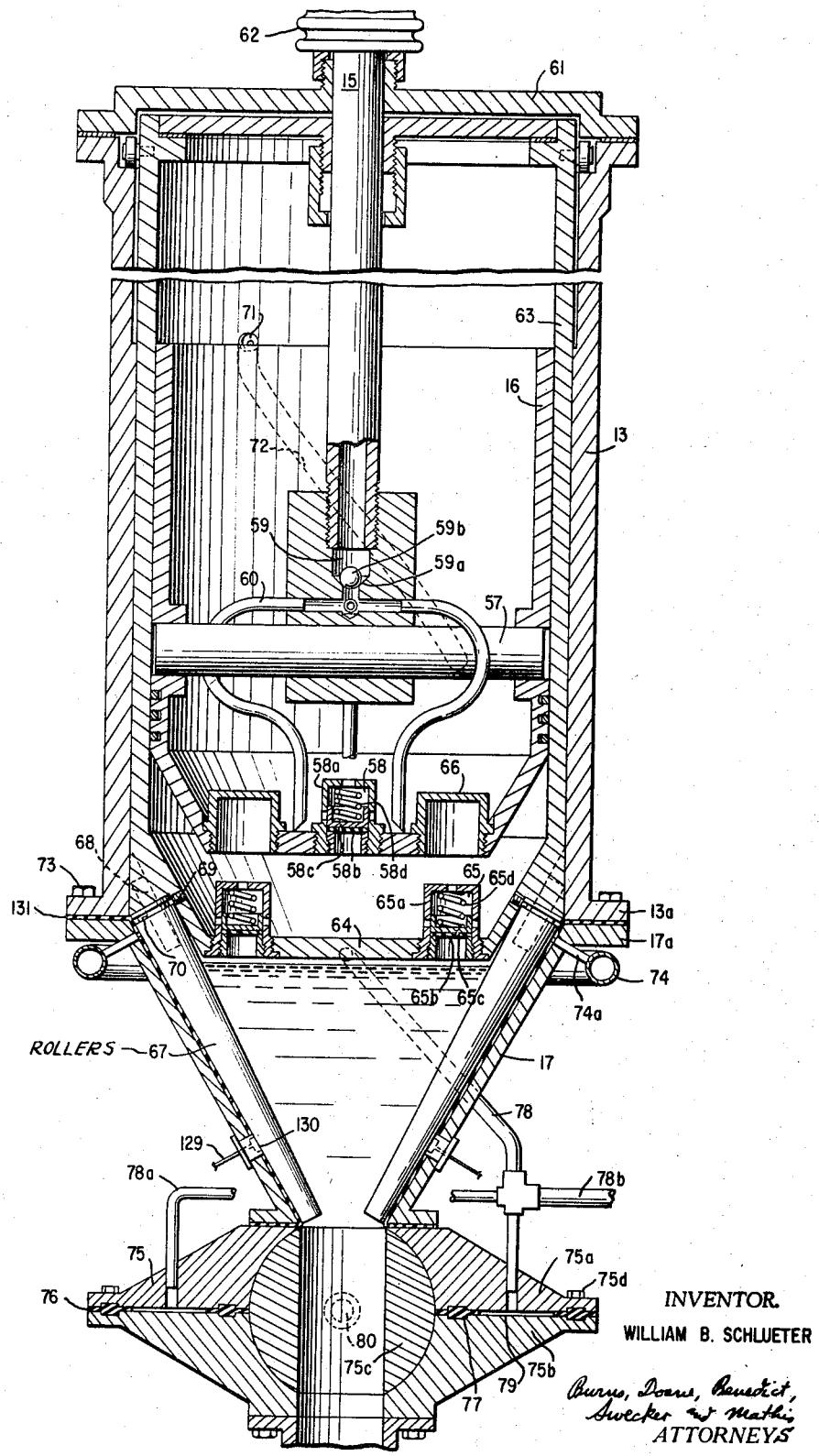

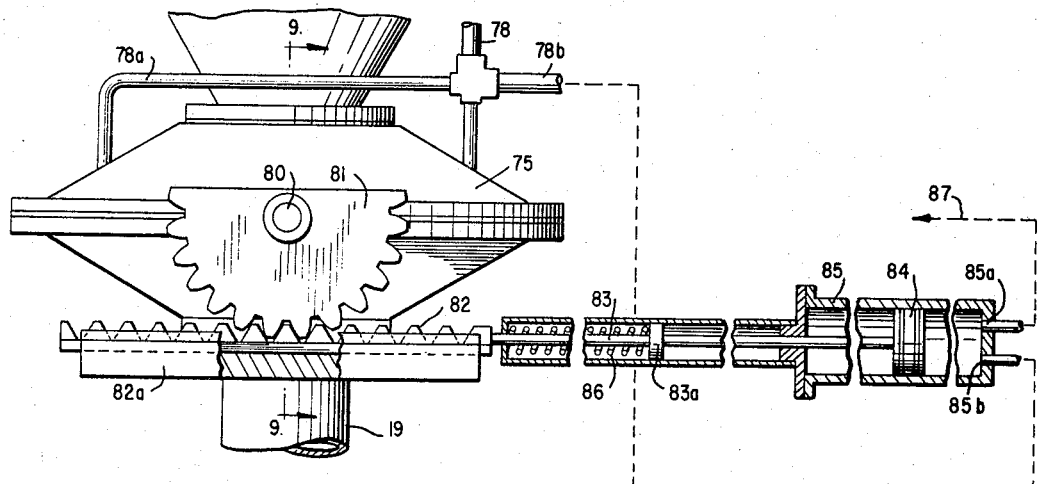
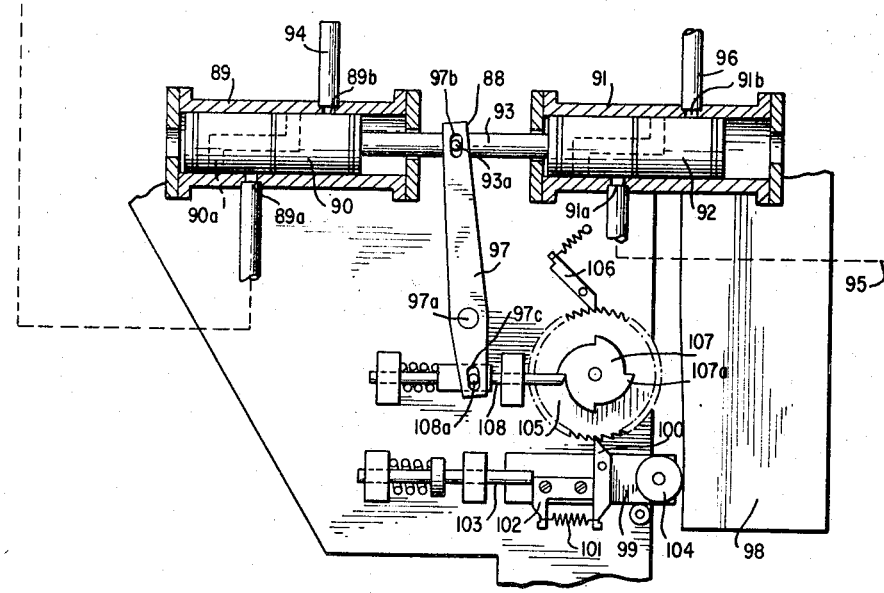
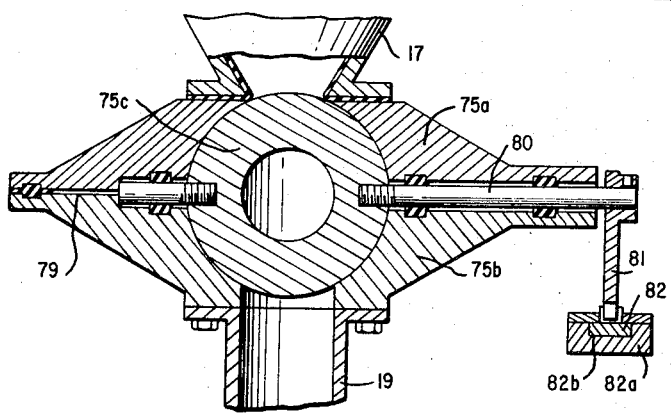

United States Patent Office 3,420,745
Patented Jan. 7, 1969

3,420,745
PISTON-CYLINDER VACUUM
DISTILLATION APPARATUS
William B. Schlueter, 1000 Betts St. NE.,
Albuquerque, N. Mex. 87112
Continuation-in-part of application Ser. No. 216,619,
Aug. 13, 1962. This application July 5, 1966, Ser.
No. 565,645
U.S. Cl. 202—160        3 Claims
Int. Cl. B01d 3/10

ABSTRACT OF THE DISCLOSURE

An apparatus which is intended for separating water as distillate from saline water. The apparatus includes a charging chamber for the saline water which is operated under vacuum pressure. A cylinder above the chamber contains a reciprocating piston. A vapor barrier separates the cylinder and the charging chamber. Water vapor is withdrawn from the charging chamber upon reciprocation of the piston through check valve means in the piston and vapor barrier. An electrical potential is maintained between the piston and the water in the charging chamber.

---

This is a continuation-in-part of applicant's copending application Ser. No. 216,619, filed Aug. 13, 1962 now abandoned, entitled "Method and Apparatus for Exracting a Solvent From a Solution."

This invention relates to a method and apparatus for extracting a solvent from a solution. Specifically, it relates to the extraction or separation of pure water from a solution of salt material dissolved in water.

Heretofore a large variety of techniques has been employed in extracting solvents from solutions. Particular attention has been directed to the development of a feasible scheme for extracting pure water from salt water for the purpose of supplying irrigating and drinking water.

In general, the previously employed techniques for extracting fresh water from salt water have been uneconomical and prohibitively slow in operation. The apparatus employed frequently has been bulky, complicated and difficult to operate and often required fuel or other man made energy for its operation.

Recognizing the need for an improved and feasible mechanism for extracting fresh water from salt water, it is an objective of this invention to provide a method and apparatus by means of which this extraction may be expeditiously and economically accomplished.

It is also an object of this invention to utilize naturally available energy as the driving force in the operation of the extraction processes.

It is a further object of the invention to provide an apparatus in which all components are actuated either directly or indirectly by a common energy source.

A still further object of the invention is to provide an apparatus which operates continuously and automatically such that it may be placed in a remote location and operated without attendants.

Another object of the invention is to simultaneously employed multiple, water separating techniques in extracting fresh water from salt water.

A further object of the invention is to provide an extraction method and apparatus which achieves a rapid separation of fresh water from salt water.

A final object of the invention is to provide a fresh water extraction apparatus which is structurally compact and rugged.

In accomplishing the foregoing objectives, an extraction technique is employed in which a volume of water and dissolved, soluble material is placed in a charging chamber. An electrical potential is created between a surface of this volume of water and a surface spaced therefrom. A vacuum is created in the space between the water surface and the spaced surface. The volume of water may also be agitated. Water vapor is then removed from the space betwen the water surface and the other spaced charged surface.

The apparatus for creating the vacuum and removing the water vapor includes a charging chamber, a cylinder, a piston mounted for reciprocation within the cylinder, and a barrier between the charging chamber and the piston. First valve means are included in the barrier to allow vaporized solvent, i.e., water, to pass from the charging chamber through the barrier and into the cylinder and to prevent solvent from returning from the cylinder to the charging chamber. Second valve means located in the piston allow solvent condensed within the cylinder to pass through the piston to the back side thereof while preventing vaporized solvent within the cylinder from passing through the piston during the condensing operation.

A unique mechanism is provided for preventing the accumulation of solid salt material on the walls of the charging chamber. In this mechanism the barrier between the charging chamber and the piston is mounted for rotational movement about the axis of the piston. Cam means are arranged betwen the piston and the barrier whereby the barrier is caused to rotate about the piston axis in response to linear piston movement. Roller means are supported by and extend from the barrier to engage the walls of the charging chamber. Rotational movement of the barrier is transmitted to the roller means for the purpose of removing solid material from the charging chamber walls. Movement of the roller means is also effective to agitate the water volume.

Additional facets of the invention reside in a unique pump structure for removing condensed solvent from the apparatus, in a unique outlet valve incorporated in the charging chamber for the purpose of discharging material from the chamber, and in the use of a static generator as the means of creating an electric potential between the surface of water in the charging chamber and the front face of the piston to enable it to function as a spaced, charged surface.

In describing the invention, reference will be made to a preferred embodiment illustrated in the appended drawings.

In the drawings:

FIGURE 1 is a schematic view of the overall extraction system, including the driving energy source.

FIGURE 2 is a side elevational view of the extraction apparatus apart from its driving energy source.

FIGURE 3 is a sectional elevational view of a pump employed for circulating an energy providing fluid.

FIGURE 4 is a sectional elevational view of the piston, cylinder, barrier, charging chamber and charging chamber outlet valve included in the extraction apparatus.

FIGURE 8 is a schematic and partially sectioned elevational view of the components of the charging chamber outlet valve, the outlet valve operating mechanism, and the control mechanism for actuating the operating mechanism.

FIGURE 9 is a sectional view of the charging chamber outlet valve taken along the lines 9—9 of FIGURE 8.

Figure 5:
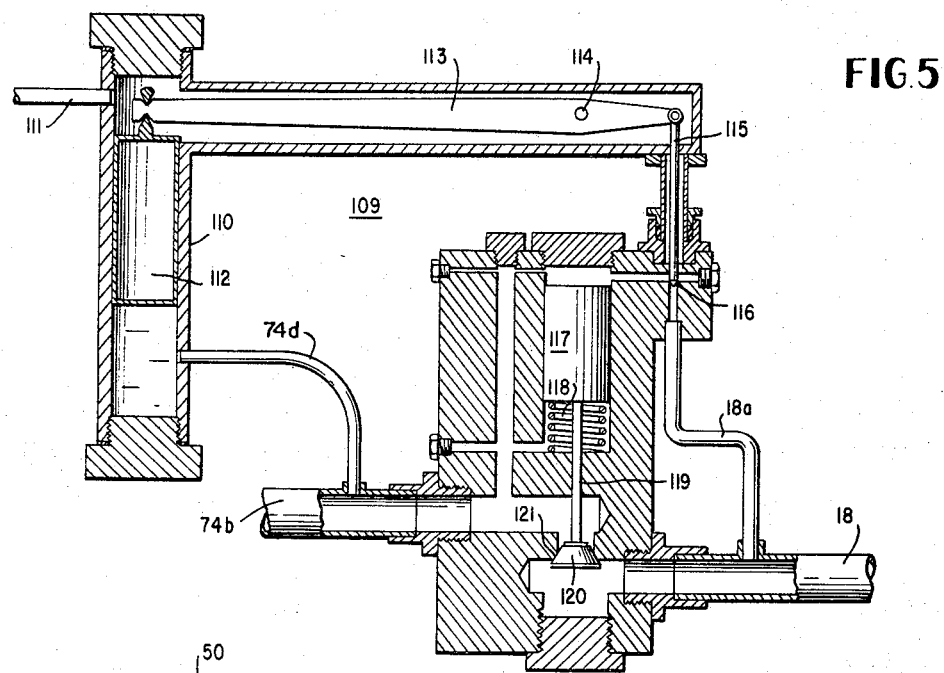
FIGURE 5 is a sectioned elevational view of a liquid level control mechanism associated with the charging chamber.

In the practice of this invention, the energy required for the extraction or separation of fresh water from salt water is provided by ambient sources. In the preferred embodiment, water is employed as the energy transfer means.

As shown in FIGURE 1, the system includes a fresh water extraction apparatus 1, a conduit 2 providing a source of relatively cold water, and a conduit 3 providing a source of relatively hot water. A conduit 4 supplies vaporized, extraction apparatus driving fluid which is maintained under pressure.

In FIGURES 1 and 2, the extraction apparatus is illustrated as including vertical outer frame 5 and an inner frame 6, supported at opposite ends by piston rods 7 and 8 for vertical reciprocation. Piston rod 7 extends from an upper piston 9 which is mounted within a cylinder 10 at the top of frame 5. Piston rod 8 extends from a lower piston 11 which is mounted within a cylinder 12 at the base of frame 5. Rods 7 and 8 are sealed to cylinders 10 and 12 by bellows type seals 10a and 12a respectively.

In the intermediate portion of frame 5, a stationary extraction cylinder 13 is supported by bracket 14 secured to the frame 5. A reciprocable piston rod 15 extends from a piston 16 within the cylinder 13 as illustrated in FIGURE 4, for attachment to the frame 6.

At the base of cylinder 13 there is positioned a charging chamber 17 for receiving a volume of saline water. Such saline water is extracted from the saline water circulating system and is supplied to the charging chamber 17 from a branch conduit 18. Separated salt material and excessively saline water is discharged from the chamber 17 through a conduit 19. Fresh water extracted from the charging chamber is discharged from the apparatus through outlet 20 communicating with a fresh water discharge conduit 21.

Vaporized fluid for driving the piston 9 and 11 is supplied through the conduit 4. A valve 22 alternately directs vaporized fluid to the upper and lower ends of pistons 9 and 11. For this purpose there is provided a conduit 23 extending from piston control valve 22 to the top of cylinder 10 and a conduit 24 extending from valve 22 to the base of cylinder 10. Conduit 23 also extends to the top of cylinder 12, while conduit 24 also extends to the base of cylinder 12.

Fluid exhausted from cylinders 10 and 12 during movement of the pistons 9 and 11 is transmitted through conduit 23 or conduit 24, depending upon the direction of movement of pistons 9 and 11, and is passed through valve 22 into exhaust conduit 25.

Exhaust conduit 25 extends to a condenser 26. Condensed piston driving fluid passes through condensing coils in condenser 26, into a conduit 40, a liquid receiver 41, and a conduit 27, and then to a circulating pump 28. Condensed fluid is transferred by circulating pump 28 to a conduit 29 and then into expansion coils within an evaporator 30. A conventinoal flow control 31 is provided for appropriately regulating the flow of fluid into an evaporator 30. Within evaporator 30, the piston driving fluid is vaporized so as to become gaseous in nature. The vaporized piston driving fluid then passes through conduit 4 to the control valve 22 for controlled return to pistons 9 and 11.

Low temperature water for the condenser 26 is supplied from conduit 2. Movement of the water through the conduit 2 and into the condenser 26 and the remainder of the water circulating system is effected by a water circulating pump 32. Water pressurized by pump 32 passes through conduit 33 into the base of condenser 26. Cold water entering the base of condenser 26 passes through the condenser 26 in heat exchanging relation with condensing coils and issues from a conduit 34 at the top of the condenser. Thus, within the condenser 26, the piston driving fluid circulated through the condensing coils is cooled and condensed while the water is heated.

A valve 35 is provided for controlling the flow of fluid in conduit 34. The valve 35 may be positioned to direct all the flow of water from the conduit 34 through a branch passage 36 and into a solar heat collector 37. Solar heat collector 37 merely comprises a conduit coil network exposed to the sun so as to allow water within the coils to absorb solar heat. Heated water issues from collector 37 and flows into hot water supply conduit 3. Supply conduit 3 enters the base of evaporator 30 and passes through the unit in heat exchanging relation with its evaporator coils to issue through discharge conduit 38.

Depending upon the degree to which water issuing from condenser 26 has become heated through heat transfer with the condenser coils, a portion, or at times, possibly all of this flow may be transmitted directly through conduit section 39 into hot water supply conduit 3 so as to bypass the solar collector 37. As will be appreciated, valve 35 may be an automatic blending valve designed to automatically control the temperature of fluid in conduit 3 which flows to evaporator 30.

As is illustrated in FIGURE 1, hot water from conduit 3 passes through evaporator 30 in heat exchanging relation with evaporator coils carrying condensed fluid supplied from condiut 29. Thus the heat from the water in conduit 3 is employed to vaporize the condensed piston driving fluid and impart energy to this fluid for the actuation of pistons 9 and 11.

Condensed piston driving fluid issues from condenser 26 through a conduit 40 and passes through a conventional liquid receiver 41 enroute to circulating pump 28. Vaporized piston driving fluid issues from evaporator 30 for transmission into conduit 4. A liquid trap 42 is provided in conduit 4 to separate any condensed piston driving fluid from the gaseous flow. Such condensed fluid is allowed to recirculate through evaporator 30 by means of return conduit 43.

It is now anticipated that, for efficiency purposes, an alternate from of the present invention might include any type of engine means for driving pistons 9 and 11. Similarly, any suitable heat exchanger means may be utilized to preheat the saline water.

The system may be operated with a variety of piston driving fluids. In general, such fluids should be characterized by a low boiling point and relative ease of condensation. A particularly desirable fluid is ethane.

It is contemplated that the system will be operated with a temperature differential of 10° F. or greater. Where the temperature of the ethane in the expansion coils is 78.8° F. the pressure in these coils will be 621.8 p.s.i.a. or less. Where the temperature in the condensing coils is 68° F. the pressure in these coils will be 546.9 p.s.i.a. or greater. With the ethane existing at these pressures within the expansion and condensing coils, the available pressure differential for operating the extraction apparatus will be 74.9 p.s.i.a. or less. This pressure differential will partially result from the increase in temperature of the ethane and from the pressurization effect of the pump 28.

Desirably the water employed to supply the energy will be the salt water from which fresh water is to be extracted. Thus, saline water is circulated into supply conduit 2 and saline water to charge chamber 17 is supplied by conduit 18 which branches from conduit 3. This saline is preheated either from passage through solar collector 37, by passage through condenser 26, or by an absorption of heat from both solar collector 37 and condenser 26.

Figure 6:
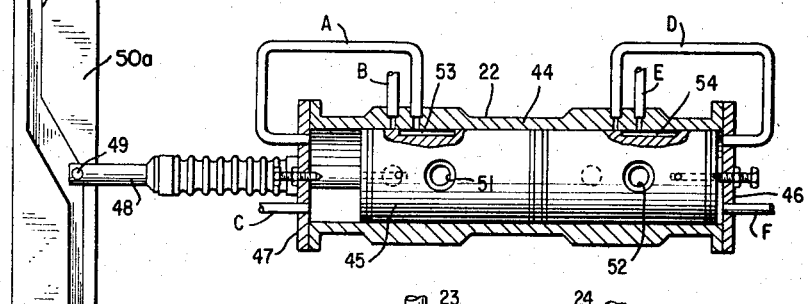
FIGURE 6 is a partially sectioned elevational view of a control valve employed for controlling the flow of energy providing fluid to the driving mechanism of the extraction apparatus.
Figure 7:
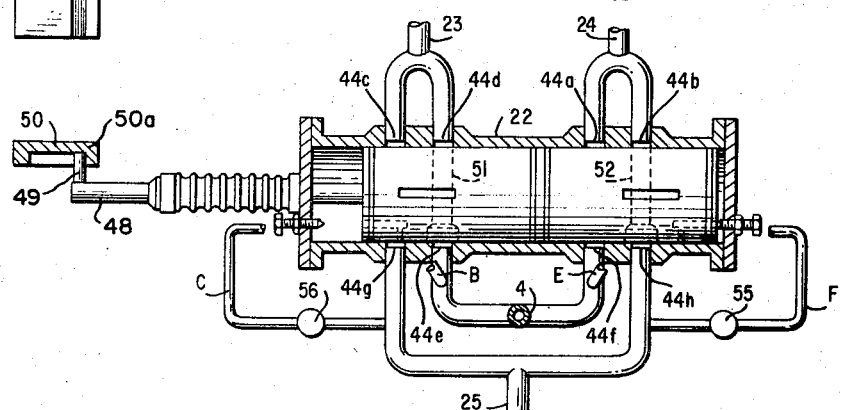
FIGURE 7 is a partially sectioned top plan view of the control valve shown in FIGURE 6.

In examining the operation of the extraction apparatus 1, the operation of the ethane flow control valve 22 will first be considered. As shown in FIGURES 6 and 7, the valve 22 includes a generally cylindrical casing 44, a slide 45, end plates 46 and 47 for closing the ends of the cylinder 44, and an operating rod 48 extending from slide 45 through end wall 47. Rod 48 includes a cam follower 49 which extends into a cam track 50 carried by a plate 50a on the vertically reciprocable inner frame 6, as shown in FIGURES 1 and 2. Valve slide 45 includes transverse passages 51 and 52 which pass entirely through the valve slide body and also includes longitudinal, peripherally spaced grooves 53 and 54.

Conduit 24 extends from the lower ends of the operating cylinders 10 and 12 to communicate with casing passages 44a and 44b. Conduit 23 extends from the upper ends of cylinders 10 and 12 to communicate with cylinder passages 44c and 44d. Ethane supply conduit 4 branches to communicate with casing 44 at passages 44e and 44f. Ethane exhaust conduit means 25 branches from passages 44g and 44h of casing 44.

Movement of cam track 50 caused by reciprocation of the frame 6 is effective to move slide 45 within casing 44 so as to obtain the desired communication between the ethane supply conduit 4 and exhaust conduit 25 and conduits 23 and 24 which lead to the cylinders 10 and 12. As shown in FIGURES 6 and 7, slide 45 has been moved to the extreme right so as to place supply conduit 4 in communication with the upper ends of cylinders 10 and 12 through conduit 23. Conduit 24 leading from the bottom ends of the cylinders 10 and 12 is in communication with the exhaust conduit 25. Were cam track 50 to be moved downwardly, rod 48 would be pulled to the left through cooperation between cam follower 49 and the cam track 50. As will be evident from FIGURES 6 and 7, this leftward movement would be effective to reverse the application of ethane pressure to the pistons 9 and 11. In its leftward position, slide 45 would be effective to place conduit 24 extending from the bottoms of cylinders 10 and 12 in communication with ethane supply conduit 4, while conduit 23 leading from the top of the cylinders would be in communication with exhaust conduit 25.

It thus will be seen that reciprocation of frame 6 itself is effective to operate valve 22 so as to reverse the direction of frame movement. With the valve positioned as illustrated in FIGURES 6 and 7, pressurized ethane is being supplied to the upper ends of pistons 9 and 11 so as to drive the frame 6 and the cam track 50 down. Near the lower end of the travel of pistons 9 and 11, the rod 48 will be moved to the left by the cam track 50 so as to reverse the ethane conduits and supply pressurized ethane to the lower ends of the pistons 9 and 11 and thus cause the pistons to reverse their direction and move upwardly. It will be understood that the ends of the passages 51 and 52 and the passages 44a, 44b, 44c, 44d, 44e, 44f, 44g and 44h are sized so as to effect the desired interval of communication between the ethane conduits 4 and 25 and the piston conduits 23 and 24.

Desirably, the pressurized ethane is employed to facilitate the operation of the valve 22. As illustrated in FIGURES 6 and 7, at the left end of casing 44, a conduit A extends from conduit groove 53 to intersect end plate 47. A conduit B also extends from groove 53 to communicate with ethane supply conduit 4. A conduit C extends from end plate 47 to communicate with ethane exhaust conduit 25. On the right side of casing 44, a conduit D extends from groove 54 to intersect casing end plate 46. A conduit E also extends from groove 54 to communicate with ethane supply conduit 4. A conduit F extends from end plate 46 to communicate with ethane exhaust conduit 25.

Referring to FIGURE 6, as slide 45 begins its leftward movement, the end of conduit D which intersects casing 44 will be uncovered so as to allow pressurized ethane to flow through conduit E, groove 54, and conduit D into the space to the right of slide 45. This pressurized ethane will tend to urge the slide to the left. This ethane acting on the right side of slide 45 escapes through conduit F into exhaust conduit 25. The rate of escape may be controlled by a needle valve 55. As the end of conduit B is uncovered, pressure is applied to the left side of slide 45 in a manner similar to that in which ethane pressure is applied to the right side. Gaseous ethane, acting on the left side of slide 45 so as to tend to move the slide to the right, escapes into ethane exhaust conduit 25. This rate of escape is controlled by needle valve 56. It thus will be seen that by appropriately regulating needle valves 55 and 56, the slide 45 may be substantially balanced by pressurized ethane acting upon both ends. This slide valve balancing provides for efficient operation with a nominal operating force. It should be noted that the length of grooves 53 and 54 are such as to cut off the slide balancing pressure at the extreme limits of the slide movement so as to insure that the pressurized ethane will not interfere with the reversal in slide movement.

The manner in which frame 6 is reciprocated has been described. As previously noted, frame 6 supports a piston rod 15 extending from a piston 16 mounted within the stationary cylinder 13. The detailed structure and operation of the piston 16 and cylinder 13 will now be described with reference to FIGURE 4.

Piston rod 15 is connected to piston 16 by an assembly including transverse connecting pin 57. In the head of the piston 16 there is positioned a valve means in the form of an upwardly opening, spring biased check valve 58. This valve includes a perforate valve casing 58a, a valve seat 58b, a valve plate 58c resting on the top of seat 58b, and a coil spring 58d, which urges valve plate 58c downwardly against the seat 58b.

As illustrated, the piston rod 15 is hollow. A downwardly seating check valve 59 communicates with the interior of the rod 15. Valve 59 comprises a valve seat 59a and a ball valve 59b resting upon the seat 59a. A plurality of conduits 60 extend from the check valve 59 to communicate with spaced portions of the back side of the head of piston 16.

The upper end of cylinder 13 is closed by cylinder plate 61 through which rod 15 slideably projects. An axially extensible, bellows seal 62 is provided between the plate 61 and the rod 15.

Within the cylinder 13 there is rotatably mounted an inner cylinder-like component 63. Component 63 includes a lower end plate 64 positioned beneath the head of piston 16. A plurality of downwardly seating check valves 65 are provided in plate 64. Each such check valve 65 includes a perforate casing 65a, a valve seat 65b, a plate valve 65c resting on valve seat 65b, and a coil spring 65d urging the plate 65b downwardly. To allow the head of the piston 16 to move into flush engagement with, or close proximity to, the plate 64, the head of the piston 16 may be suitably recessed to receive the valve casings 65a. Such recessing may comprise plurality of individual, cylindrical recesses 66 aligned above the casings 65a.

Component 63, including plate 64, functions as a vapor barrier between piston 16 and charging chamber 17. Component 63 also functions as a support for a plurality of rotatable, tapered rollers 67. Each roller 67 is journaled on a pin 68 extending from component 63. Each thus rotatably mounted roller 67 may be secured by a pin or set screw 69 extending partially and loosely into a groove 70 in the upper end of the roller 67. As illustrated, each roller 67 is disposed to engage the inner side wall of the conical chamber 17.

Piston 16 and component 63 are interconnected by cam means such that the component 63 is caused to undergo rotational movement in response to vertical linear movement of piston 16. This cam means includes a roller type follower 71 projecting inwardly from the inner cylindrical wall of the component 63 and an inclined or curved cam track 72 formed in the outer periphery of piston 16 and extending to the top of this piston. The roller 71 is mounted such that the piston 16 may move upwardly to allow the recesses 66 to clear the valve casings 65a before the roller 71 enters the curved or inclined portion of the cam track 72. In this way rotational movement of the component 63 in response to the coaction of cam 71 and cam track 72 is avoided prior to the clearance of the recesses 66 from the check valves 65.

The tapered rollers 67 engage the conical side walls of the chamber 17 so as to function as thrust bearings for the component 63. In this way oscillatory movement of the component 63 and the rollers 67 about the axis of the piston 16 is facilitated.

The piston 16 is designed to create a high vacuum in space above a volume of saline water contained within the charging chamber 17. On the upper stroke of the piston 16, vaporized water is drawn through the check valves 65 into the space between the vapor barrier 64 and the head of the piston 16. On the downward stroke of the piston 16, the vapor previously drawn through the barrier 64 is compressed and condensed. The obtaining of condensing pressure is assured by proper selection of the resistance of coil spring 58d in the check valve 58. At the lowermost portion of the travel of the piston 16, condensed water lying on the top of the vapor barrier 64 is allowed to pass through the check valve 58 to the back side of the piston 16 by the yielding of spring 58d. On the next upper stroke of the piston 16 the water collected on the back side of the piston 16 is pumped through the hollow rod 15. This pumping is effected as a result of the pressurization of air within the upper confined portion of the cylinder 13. This pressurized air acts upon water lying on the back side of the head of the piston 16 to force this water through the conduits 60 and past the check valve 59 into the hollow interior of the rod 15. Fresh water thus separated from the saline water in charging chamber 17 is transmitted away from the apparatus through the conduit 21 extending from the upper end of hollow rod 15, as shown in FIGURES 1 and 2.

Having examined the structure and operation of the vacuum producing portion of the system, attention will now be given to the charging chamber 17.

Charging chamber 17, as shown in FIGURES 1, 2 and 4, and as previously noted, is conical in configuration. The side wall of charging chamber 17 tapers upwardly and outwardly to mate with cylinder 13. Cylinder 13 and chamber 17 are joined by fasteners 73 extending through cylinder flange 13a and chamber flange 17a. An annular fill line 74 for admitting saline water to the interior of charging chamber 17 is mounted beneath the flange 17a. A plurality of transverse conduit sections 74a extend from annular fill line 74 to communicate with the interior of the charging chamber.

An outlet valve 75 is mounted on the lower end of charging chamber 17. Outlet valve 75, as will be appreciated by one skilled in the art, is suitably insulated from subjacent elements, and comprises upper and lower clamp members 75a and 75b, respectively, which circumscribe a rotary valve plug 75c. Clamp members 75a and 75b are mounted for slight converging movement but are restrained against mutually outward movement by connecting bolts 75d. A yieldable neoprene gasket 76 separates the outer edges of clamp members 75a and 75b while a gasket 77 yieldably separates the inner edges of the clamp members adjacent rotary plug 75c.

A conduit 78 extends from the upper portion of the interior of the charging chamber 17. Conduit 78 branches to provide a plurality of branch conduit portions 78a which communicate with an annular cavity 79 between gaskets 76 and 77. Another branch conduit 78b extends to a control mechanism to be hereinafter described.

As shown in FIGURES 8 and 9, an operating shaft 80 extends from rotary valve plug 75c to a sector gear 81 mounted on the exterior of the outlet valve 75. Sector gear 81 comprises a portion of a valve operating mechanism which also includes a horizontally reciprocable, toothed rack 82 engaging gear 81. Toothed rack 82 is mounted on a rod 83 which extends from a piston 84 mounted within a cylinder 85 rigidly mounted on frame 6. Sliding movement of rack 82 is stabilized by a stationary trackway 82a, having a groove 82b which slideably receives the rack 82. Operating rod 83 is urged to the right by a coil spring 86 engaging an abutment 83a on the rod 83.

A pressurized fluid inlet 85a is formed in the right end of cylinder 85 by means of which pressurized fluid may be introduced within the cylinder to act on the piston 84 and move the toothed rack 82 to the left. The fluid supplied to the cylinder is water from a conduit 87 which communicates with the pressure side of pump 32. An outlet port 85b is provided for exhausting pressurized water from the cylinder.

Conduit 78b extends to an outlet valve control unit 88. Control unit 88 includes a cylinder 89 containing a slide 90 and a cylinder 91 containing a slide 92. Slides 90 and 92 are joined by a connecting rod 93.

Conduit 78b communicates with a port 89a in cylinder 89. A port 89b in cylinder 89 communicates with the atmosphere through a conduit 94. A generally L-shaped passage 90a is provided in slide 90 by means of which ports 89a and 89b may be placed in fluid communication.

Cylinder 91 includes a port 91a which communicates with a conduit 95 extending to port 85b in cylinder 85. A port 91b in cylinder 91 communicates with a conduit 96 which is in fluid communication with the suction side of the water pump 32.

An operating lever 97 is provided for shifting the connecting rod 93 so as to move the slides 90 and 92. Lever 97 is pivotally mounted at pivot point 97a, has a slot 97b in its upper end engaged with a transverse pin 93a on connecting rod 93, and includes a slot 97c at its lower end.

A ratchet mechanism is provided for operating the lever 97 so as to shift the valve slides 90 and 92 to a predetermined number of cycles of the frame 6 and piston 16. As shown in FIGURES 1, 2 and 8, a cam 98 is formed on the lower end of inner frame 6. As will be apparent from the FIGURE 8 illustration, vertical reciprocation of cam 98, as effected by reciprocation of the frame 6 and plunger 16, moves a plunger 99 to the left in response to each downward movement of the frame 6 and plunger 16. A detent 100 is pivotally mounted on plunger 99 and resiliently urged in a clockwise direction by tensioning spring 101. A stop 102 causes the spring 101 to secure the detent 100 in a vertical position. The leftmost end of stop 102 is engaged by a spring biased plunger 103 which tends to urge the plunger 99 to the right to hold the plunger in engagement with the cam 98. Engagement between the plunger 99 and the cam 98 is effected through a roller 104 mounted on the rightmost end of the plunger 99.

Detent 100 releasably engages a ratchet wheel 105. Counterclockwise movement of ratchet wheel 105 is prevented by a spring biased and pivoted detent 106. A cam 107 is mounted upon ratchet wheel 105 and includes a plurality of projecting cam portions 107a, each having gradual rise and and an abrupt descent. A spring biased plunger 108 is biased to the right into engagement with cam 107. Plunger 108 is connected with lever 97 by means of a transverse pin 108a extending into slot 97c.

The outlet valve 75, the outlet valve operating mechanism, and the outlet valve control are interrelated so as to cause the valve clamp to release and the valve operating mechanism to be actuated in response to a predetermined number of cycles of piston 16. With the illustrated cam which has a cam extending in each cam quadrant, this number of cycles will be the number of cycles of plunger 99 required to advance the cam 107 through a quarter revolution. This movement of cam 107 will cause the plunger 108 to move from its rightmost position to its leftmost position by advancing along the rise of a cam portion 107a. When plunger 108 is engaged by the outer extremity of a cam portion 107a, the lever 97 is moved clockwise so as to shift the valve slides 90 and 92 to the right. This movement of the slides places the ports 89a and 89b in fluid communication and the ports 91a and 91b in fluid communication.

As previously noted, conduit 78, which communicates with the annular space 79 between the relatively movable clamp members 75a and 75b, also communicates with port 89a. Conduit 78 extends from the upper portion of charging chamber 17 where a vacuum is formed through the operation of piston 16. Conduit 96 which communicates with port 91b extends from the suction side of pump 32 while port 85b, which is in fluid communication with port 91a, communicates with the pressure side of the pump 32 through conduit 87.

With the fluid network thus described, when the lever 97 is pivoted counterclockwise to the position illustrated in FIGURE 8, the port 89b and the port 89a are sealed from each other such that a vacuum is maintained in the space 79 so as to cause the clamp members 75a and 75b to move together and secure or lock the rotary valve plug 75c in the closed position as shown in FIGURE 9. The ports 91b and 91a are mutually sealed from each other such that the pressure of pump 32 is applied against the end of piston 84 so as to urge the rod 83 to the left. This leftward movement of rod 83 is effective to position the rack 82 and the gear sector 81 in a closed valve position.

When lever 97 is moved clockwise by operation of the cam 107, the ports 89a and 89b in cylinder 89 are placed in fluid communication, while the ports 91a and 91b of cylinder 91 are placed in fluid communication. With the valve components thus disposed, the vacuum condition existing in conduit 78 is vented to atmosphere through conduit 94. As a result, valve clamps 75a and 75b are released from locking engagement with rotary valve plug 75c. The pump pressure applied through conduit 87 is allowed to vent through interconnected conduits 95 and 96 to the suction side of the pump 32. With the pump pressure relieved, piston 84 is moved to the right by coil spring 86. This rightward movement, through interengagement of rack 82 and gear 81 is effective to rotate plug 75c and place the outlet valve in the open position shown in FIGURE 4 for the discharge of material from charging chamber 17.

When valve 75 is open, water of excessive salinity and deposited, solid saline material will be discharged. The accumulation of deposited saline material on the walls of chamber 17 is prevented by the rolling action of rollers 67. Rollers 67, in oscillating about the walls of the charging chamber, roll over and crush accumulated salt crystals, causing them to move to the bottom of the chamber where they may be discharged when the rotary valve plug 75c is moved to an open position.

After the discharge valve has opened, continued reciprocation of frame 6 and piston 16 will advance the cam 107 such that the plunger 108 will be allowed to move abruptly past the crest of a cam portion 107a. This will restore the system to the closed and locked valve position. A new charge of saline water is then supplied through fill line 74.

As shown in FIGURE 2, fill line 74 communicates with a downwardly extending branch conduit 74b. Branch conduit 74b communicates with supply conduit 18 through a flow control valve unit 109, illustrated in FIGURE 5. Valve unit 109 includes a float chamber 110 which communicates with the atmosphere through a conduit 111. Cylinder 110 communicates with the interior of chamber 17 through conduits 74, 74a, 74b (FIGURE 4) and a connecting short conduit 74d (FIGURE 5). A float 112 is mounted within the float chamber 110 and connected with one end of a flow controlling lever 113, which lever is pivotally mounted at pivot point 114. The other end of lever 113 is pivotally engaged with a pilot valve 115. Pilot valve 115 engages a seat 116 in a branch conduit 18a extending from supply conduit 18. Branch conduit 18a is in fluid communication with a piston 117 which is biased upwardly by a coil spring 118. A rod 119 extends downwardly from piston 117 to engage an upwardly seating valve 120. Valve 120 engages a seat 121 between branch conduit 74b and supply conduit 18.

When valve 75 is open, float 112 moves downwardly in response to the lowering of the liquid level in conduit 74d and in chamber 17 so as to open pilot valve 115 and allow fluid pressure to be applied through branch conduit 18a to the top of piston 117. This application of pressure to piston 117 is effective to overcome the resistance of coil spring 118 and move the valve 120 downwardly. In this way, fresh saline water is allowed to flow into branch conduit 74b for flushing and replenishing charging chamber 17. The float chamber 110 is mounted relative to the charging chamber such that when a desired liquid level has been reached within the charging chamber, the float 112 is moved to an upper position so as to close pilot valve 115. This level is such as to provide some space between the water charge and the barrier 64.

In order to facilitate the extraction of fresh water from saline water in the charging chamber 17, means are provided for creating an electrical potential between the exposed surface of water in the charging chamber and a surface spaced above this water surface.

It is contemplated that the static charge will be generated by the operation of the extraction apparatus itself. To this end, there is provided a conventional constant polarity static electricity generator 122 such as disclosed in U.S. patent to Bousman, 2,588,081, or Burrill et al., 2,588,613, which generates a charge of static electricity in response to an input of mechanical energy. The term constant polarity is utilized in the sense that the charge generated does not alternate from plus to minus as A.C. current. The mechanical energy input is supplied by the movement of the inner frame 6. A toothed rack 123 is supported on the inner frame 6 so as to reciprocate vertically with movement of this frame. Toothed rack 123 engages an operating gear 124 which serves to drive the static generator 122. Generator 122 is grounded to the piston rod 15 by electrical lead 125, which extends from the negative pole of the generator. A lead 126 extends from the positive pole of the generator 122 and terminates at a small discharging sphere 127. A second discharging sphere 128 is carried by frame 6. An electrical lead 129 extends from discharge sphere 128 and communicates electrically with a plurality of electrical contacts 130 which penetrate the wall of the charging chamber 17 as shown in FIGURE 4. A charge accumulating capacitor unit 122a is connected between leads 125 and 126.

Cylinder 13 and piston 16 are electrically insulated from the charging chamber by an insulating gasket 131 interposed between cylinder flange 13a and chamber flange 17a. Gasket 131 may be extended so as to line the entire inner wall of charging chamber 17, except of course for the area through which contacts 130 project. It is contemplated that liner 131 will be fabricated of rubber or plastic material.

Component 63 and rollers 67 must be fabricated and arranged so that they do not provide a conductive path between the contacts 130 and the piston 16. This may be accomplished by fabricating these elements of non-conductive material or by providing suitable linings or coatings of insulating material. Valve 59 and connecting pin 57, as well as the body of piston 16, are conductive such that the head of piston 16 is electrically connected to the grounded terminal of the static generator through the electrically conductive rod 15.

Discharge spheres 127 and 128 are so positioned that they come into charge transferring contact when the piston 16 has moved through approximately two-thirds of its upward travel. When the piston has moved this far it has produced a relatively high vacuum in the space between the water surface in charging chamber 17 and the head of the piston 16. Thus, the static potential is applied between the water surface and the piston surface spaced above the water surface simultaneously with the creation of a high vacuum above the surface of the water but without a flow of current therebetween.

The overall structure operation of the apparatus has now been described except as concerns the pumps employed to circulate the piston driving ethane and the saline water. These pumps are illustrated in FIGURES 1, 2 and 3.

The ethane pump 28 comprises a casing 28a, a piston 28b, and upwardly opening check valves 28c, included in piston 28b. A piston rod 28d extends from piston 28b to a mounting bracket 132 secured to reciprocating inner frame 6. As shown in FIGURE 2, a bellows type seal 133 is employed between rod 28d and cylinder 28a. Cylinder 28a is stationarily secured to outer frame 5 by means of a mounting bracket 134.

Ethane is supplied to cylinder 28a from conduit 27 and is pumped by pump 28 into conduit 29. Pumping action in response to the reciprocation of rod 28b is obtained by the incorporation of an upwardly opening check valve 135 in inlet line 27 and a check valve 136 which opens in response to outward, i.e., rightward, flow as shown in FIGURES 1 and 2, in outlet line 29. As the structure of this pump is conventional, the details of its operation need not be considered.

Water circulating pump 32 comprises a cylinder 32a and a piston 32b. Piston 32b is supported upon a piston rod 32c which extends from a mounting bracket 137 secured to inner reciprocating frame 6. Cylinder 32a is stationarily secured to outer frame 5 by mounting bracket 138. Water supplied to conduit 2 branches to communicate with opposite ends of cylinder 32a. Check valves 133 and 140 are incorporated in the branched portions of inlet conduit 2, which check valves are effective to allow flow only into cylinder 32a. Outlet conduit 33 branches from opposite ends of cylinder 32a. Check valves 141 and 142 are included in each branched portion of conduit 33 to allow flow only out of cylinder 32a. With this arrangement of components, pump 32 functions as a double acting pump so as to pump fluid on both the up and the down strokes of piston 32b.

With the structure and operating characteristics of each component of the system having been described, the overall operation of the system may now be reviewed. Gaseous ethane to drive operating pistons 9 and 11 is alternately applied to opposite ends of the cylinders 10 and 12 through operations of ethane control valve 22. Reciprocating movement of the pistons 9 and 11 within the cylinders 10 and 12 is effective to reciprocate the vacuum producing piston 16 within the cylinder 13. An upward stroke of the piston 16 draws water vapor through the check valves 65 in the barrier 64 into the space between the barrier and the head of the piston 16. A subsequent down stroke of the piston 16 compresses this water vapor and condenses it for ultimate passage through the check valve 58 in the head of piston 16. Condensed water vapor thus passed to the back side of piston 16 is pumped out of the hollow piston rod 15 into discharge conduit 21. The application of a static potential at the time that a substantial vacuum has been created within the cylinder 13 is believed to materially facilitate the separation of water vapor from the saline water charge in the chamber 17. This separation may also be facilitated to some degree by the agitation of the charge of water within the charging chamber 17 as caused by the oscillation of roller 67.

After a predetermined number of cycles of the piston 16, the outlet valve 75 is opened to allow excessively saline water and deposited solid salt material to be discharged into outlet conduit 19. The accumulation of solid salts on the walls of the charging chamber 17 is prevented by the rolling action of roller 67. After the contents of the charging chamber 17 have been discharged, the valve 75 is automatically closed in response to continued operation of the piston 16 and a new charge of fresh saline water is introduced into the charging chamber. The level of water within the charging chamber is automatically adjusted to allow for some space between the volume of water and the barrier 64.

The solvent extraction system previously described is characterized by substantial operating advantages. The high vacuum produced by the piston 16, in and of itself, achieves a rapid and efficient extraction of water vapor from saline water in the charging chamber. The extraction is aided by the creation of the electric potential between the water surface and the lower face of the piston but without the flow of electricity therebetween. Doubtless the agitation of the saline water in the charging chamber by the rollers 67 further improves the vapor extraction efficiency and contributes to the success of the overall operation. The combined effect of the vacuum, the potential and the agitation causes an unusually effective separation of water vapor from a saline water body.

The novel structural combination involved in the cylinder 13, the valve piston 16, the charging chamber 17, and the barrier 64 interposed between the charging chamber and the piston 16 enables extracted water vapor to be expeditiously removed from the apparatus in condensed or liquid form. The arrangement of components is such that both the up and the down strokes of the piston perform work during this transfer operation. The incorporation of the rollers 67 provides a residue crushing structure which simultaneously serves as a thrust bearing to facilitate the crushing action. The unique outlet valve included in the charging chamber includes a clamp for positively securing the valve in closed position during the fresh water extraction operation. The energy for operating this clamp is obtained from the vacuum generated by operation of the extraction apparatus so as to avoid the necessity of employing a separate energy source. Similarly, the energy employed to actuate the outlet valve operating mechanism is obtained from a pump driven by the operation of the apparatus.

The energy required to operate the entire system is obtained from ambient or natural sources. Either directly or indirectly, this energy source operates all the various mechanisms included in the system. So long as the natural energy source remains available, the apparatus will remain in continuous and unattended operation. The rugged, refined and compact nature of the system insures nominal maintenance and operating costs and relative ease of fabrication and maintenance while obtaining a high volume and rate of fresh water recovery.

As will be appreciated from the foregoing discussion, the improved vaporization, resulting from the direct current, i.e., static potential existing between the plate 64 and the spaced water body in reservoir 17 (which may be insulated from the plate 64 by any of several conventional techniques), is not attributable to current flow induced, heat generation or ionization of the fluid to be extracted. Indeed, it is clearly contemplated that current flow or arcing between the water body and plate 64 is not to occur, at least to any consequential extent.

While the system has been described with reference to a preferred embodiment, several alternative arrangements will readily occur to those skilled in the art. For example, the structure and arrangement of components of the system such as the valves and conduits may be varied. Instead of using a continuous water circuit having hot and cold portions, separate hot and cold water circuits may be employed, each having a separate pumping unit. Similarly, an entirely separate system for supplying chamber 17 may be used. The extraction operation may be performed with the vacuum and potential applied and the charge agitated or may be performed with only unitary extraction forces. The extraction technique would be applicable to solutions other than saline water. Driving fluids such as methyl chloride, sulphur dioxide, or a variety of low boiling point hydrocarbons in lieu of ethane may be utilized for motivating pistons 9 and 11. An electric potential creating apparatus other than that illustrated may be employed for creating a potential between the surface of the solution in the charging chamber and a surface spaced therefrom. Means other than solar heat may be utilized to supply energy to the system.

The noted variations of the disclosed embodiment of the system, as well as other alternative arrangements, fall

I claim:
1. An apparatus for separating water as distillate from saline water, said apparatus comprising:
   a charging chamber for containing a volume of saline water, said charging chamber operating under vacuum pressure to cause evaporation of water vapor from the volume of water, said chamber having a vertical axis;
   a cylinder mounted above said charging chamber, said cylinder having a vertical axis;
   a piston mounted for reciprocation within said chamber for vaporizing and condensing the water, said piston having a vertical axis and a back side;
   said charging chamber, piston and cylinder being mounted with their axes in vertical alignment and with said cylinder on the back side of said piston being closed;
   a water vapor impervious barrier between said charging chamber and said piston;
   first check valve means in said barrier to allow vaporized water to pass therethrough from said charging chamber into said cylinder and prevent water from returning from said cylinder to said charging chamber;
   second check valve means in said piston to allow water condensed within said cylinder to pass through said piston to the back side thereof and prevent vaporized water within said cylinder passing through said piston;
   a hollow rod engaged within said piston and extending in said cylinder;
   a check valve mounted on said hollow rod and communicating with its hollow interior;
   conduit means communicating with said check valve extending to an area closely adjacent the back side of said piston for communicating with the condensed water delivered to said area through said second check valve means;
   cam means operatively connected between said piston and said barrier whereby said barrier is caused to rotate about the axis of said piston responsive to linear movement of said piston;
   roller means supported by and extending from said barrier to engage the walls of said charging chamber;
   and a static generator operatively connected between said chamber and said piston for creating an electrical potential between a surface of said volume of water and said charging chamber and the front face of said piston.

2. An apparatus as described in claim 1 and further including:
   outlet means in said charging chamber, said outlet means including an outlet valve for discharging material from said charging chamber;
   an outlet valve operating mechanism operatively associated with said outlet valve;
   vacuum actuated clamp means operatively associated with said outlet valve and said charging chamber adapted to be operated by a vacuum in said charging chamber for holding said outlet valve in closed position;
   and control means operatively associated with said clamp means and said outlet valve operating mechanism for releasing said clamp means and actuating said outlet valve operating mechanism to open said outlet valve in response to a predetermined interval of operation of said apparatus.

3. An apparatus as described in claim 2 and further including charging means operatively connected to said charging chamber for filling said charging chamber to a predetermined level at which a space is maintained between said level and the top of said charging chamber.

References Cited

UNITED STATES PATENTS

| | | |
|---|---|---|
| 956,097 | 4/1910 | Hoofnagle. |
| 2,339,862 | 1/1944 | Kleinschmidt _____ 203—26 X |
| 2,368,665 | 2/1945 | Kohman et al. _____ 203—10 X |
| 2,375,640 | 5/1945 | Ford _____ 203—26 X |
| 2,395,004 | 2/1946 | Kleinschmidt _____ 203—25 |
| 2,831,665 | 4/1958 | Baerfuss. |
| 3,190,817 | 6/1965 | Neugebauer et al. ____ 202—236 |
| 3,209,812 | 10/1965 | Sargeant _____ 159—13 |
| 3,290,229 | 12/1966 | Brown _____ 203—11 X |

NORMAN YUDKOFF, *Primary Examiner.*

F. E. DRUMMOND, *Assistant Examiner.*

U.S. Cl. X.R.

203—11, 26; 202—205, 176, 234; 159—1